United States Patent [19]

Stedman

[11] 4,093,259
[45] June 6, 1978

[54] VEHICLE HAVING RESILIENTLY MOUNTED COUNTERWEIGHT

[75] Inventor: Robert N. Stedman, Chillicothe, Ill.

[73] Assignee: Caterpillar Tractor Co., Peoria, Ill.

[21] Appl. No.: 793,211

[22] Filed: May 2, 1977

[51] Int. Cl. .......................................... B60R 27/00
[52] U.S. Cl. ................................... 280/755; 280/758
[58] Field of Search .................. 280/755, 758, 759; 214/142, 660, 670, 671, 672, 673, 674; 212/48; 187/9 R

[56] References Cited

U.S. PATENT DOCUMENTS

| 3,734,326 | 5/1973 | Esser | 214/142 |
| 3,991,891 | 11/1976 | Cox | 280/759 |

FOREIGN PATENT DOCUMENTS

| 1,092,489 | 11/1954 | France | 280/758 |
| 2,225,891 | 1/1974 | Germany | 280/755 |

Primary Examiner—Robert R. Song
Attorney, Agent, or Firm—John W. Grant

[57] ABSTRACT

A counterweight is positioned adjacent an end portion of a frame and is attached to the frame to permit limited up and down movement thereof relative to the frame. A resilient supporting device is mounted on the end portion of the frame and is attached to the counterweight with the supporting device being of a construction sufficient for resiliently supporting the counterweight and for cushioning shock loads exerted on the frame in response to inertia force of the counterweight.

7 Claims, 2 Drawing Figures

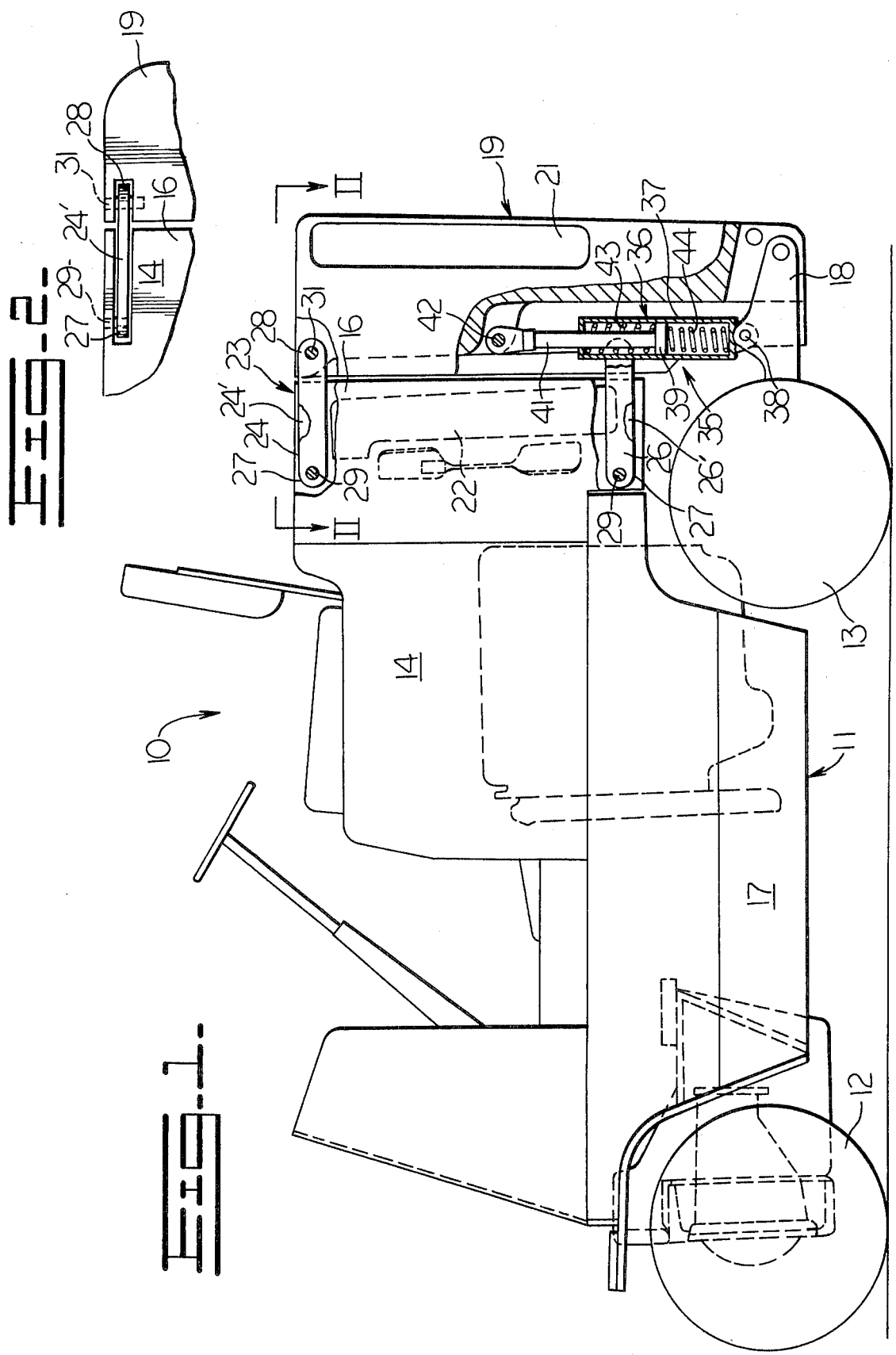

VEHICLE HAVING RESILIENTLY MOUNTED COUNTERWEIGHT

BACKGROUND OF THE INVENTION

Many vehicles, such as fork lift trucks, have counterweights rigidly attached to an end portion thereof. Fork lift trucks normally do not have springs between the frame and wheels, and one of the problems encountered therewith, particularly when the truck has the so-called cushioned tires thereon, is that the inertia forces of the counterweight causes jolting shock loads to be exerted on the frame when the vehicle is operated on rough surfaces. These shock loads are transmitted directly to the frame and eventually to the operator. It is desirable to reduce the shock loads on the frame. This would in turn decrease wear on the vehicle and reduce operator fatigue caused by the shocks.

SUMMARY OF THE INVENTION

The present invention is directed to overcoming one or more of the problems as set forth above.

According to the present invention, a vehicle has a frame having an end portion and a counterweight positioned adjacent the end portion of the frame. Means is provided for attaching the counterweight to the frame and permitting limited up and down movement of the counterweight relative to the frame. A resilient supporting means is connected to the end portion of the frame and attached to the counterweight with said resilient supporting means being of a construction sufficient for resiliently supporting the counterweight and for cushioning shock loads exerted on the frame in response to inertia force of the counterweight.

BRIEF DESCRIPTION OF THE DRAWINGS

FIG. 1 is a diagrammatic view in partial section of a work vehicle having the apparatus of this invention; and FIG. 2 is a view taken along line II—II of FIG. 1.

DETAILED DESCRIPTION

Referring now to FIG. 1 of the drawing, a vehicle such as a lift truck 10 includes a frame assembly 11 carried by front and rear wheels 12 and 13, respectively. The frame assembly includes a hood 14 having an end portion 16 and a main frame 17 having an end portion 18 extending rearwardly beyond the rear wheels. A counterweight 19 is positioned adjacent the end portion of the hood. The counterweight can be of any known construction and can have passages partially shown at 21 extending therethrough for air flow to or from a radiator 22.

A means 23 is provided for attaching the counterweight 19 to the end portion 16 of the hood 14 of the frame assembly 11 to permit limited up and down movement thereof relative to the frame assembly 11. The means includes two pair of vertically spaced links 24, 26 and 24', 26' each link having first and second end portions 27, 28. Each pair of links are positioned on a respective side of the vehicle with link 24 being spaced above the link 26. The first end portions of the links are pivotally connected to the end portion 16 of the hood 14 by pivot pins 29. The second end portions of the links are pivotally connected to the counterweight 19 by pivot pins 31. It will be seen from the drawing that the arrangement of links is such that they constitute a parallelogram linkage assembly.

A resilient supporting means 35 is mounted on the end portion 18 of the main frame 17 and is attached to the counterweight 19. The resilient supporting means is of a construction sufficient for resiliently supporting the counterweight and for cushioning shock loads exerted on the main frame due to the inertia force of the counterweight. The resilient support means of the present disclosure includes a fluid jack 36 having a cylinder 37 pivotally connected to the end portion 18 by a pivot pin 38. A piston 39 is slidably disposed within the cylinder and a piston rod 41 has one end attached to the piston in the usual manner with its other end pivotally connected to the counterweight at a pivot 42. Preferably, a pair of coil springs 43 and 44 are positioned within the cylinder on opposite sides of the piston 39 and resiliently resist the retraction or extension of the piston rod relative to the cylinder.

Alternatively, the coil springs 43 and 44 can be deleted and the fluid jack 36 connected to an accumulator for cushioning the retraction of the piston. Also, another form of resilient supporting means may include a coil spring or resilient elastomer positioned between the end portion 18 of the frame 17 and the counterweight 19 in combination with a shock absorber to dampen the oscillatory movement of the counterweight.

In the operation of the lift truck, when the rear wheels 13 of the lift truck 10 contact a bump, for example a rock, the immediate reaction is for the wheel and frame 17 to move upward over the bump. However, the counterweight acts against the spring 44 which yields under the inertia force of the counterweight permitting relative movement between the counterweight and the frame. This cushions the shock loads due to the inertia force of the counterweight and will minimize the transmission of shock loads to the frame.

Other aspects, objects and advantages of this invention can be obtained from a study of the drawings, the disclosure and the appended claims.

The embodiments of the invention in which an exclusive property or privilege is claimed are defined as follows:

1. A vehicle comprising:
   a frame having an end portion;
   a counterweight positioned adjacent the end portion of the frame;
   means for connecting the counterweight to the frame and permitting limited upward and downward movement thereof relative to the frame; and
   resilient supporting means connected to the end portion of the frame and attached to the counterweight for resiliently supporting the counterweight and for cushioning shock loads exerted on the frame in response to inertia force of the counterweight, said resilient supporting means being independent of said connecting means.

2. The vehicle of claim 1 wherein said connecting means includes a pair of links each having first and second end portions with one link being spaced above the other link, said first end portions of the links being pivotally connected to the end portion of the frame, and said second end portions being pivotally connected to the counterweight.

3. The vehicle of claim 1 wherein said resilient supporting means includes biasing means having a cylinder, a piston slidably disposed therein and a piston rod attached to the piston, said cylinder and said piston rod each being attached to a respective one of the end portion and the counterweight, and means for resiliently resisting said upward and downward movement of said counterweight.

4. The vehicle of claim 3 wherein said last means includes first and second springs positioned within the cylinder on opposite sides of the piston.

5. The vehicle of claim 3 wherein said biasing means is a fluid jack.

6. A vehicle comprising:
a frame having an end portion;
a counterweight positioned adjacent the end portion of the frame;
means for connecting the counterweight to the frame for allowing limited upward and downward movement thereof relative to the frame; and
resilient supporting means for resiliently supporting the counterweight and for cushioning shock loads exerted on the frame in response to inertia force of the counterweight, said resilient supporting means including biasing means having a cylinder, a piston slidably disposed therein and a piston rod attached to the piston, said cylinder and said piston rod each being attached to a respective one of the end portion and the counterweight, and means for resiliently resisting retraction and extension of the piston rod relative to the cylinder.

7. The vehicle of claim 6 wherein said last means includes first and second springs positioned within the cylinder on opposite sides of the piston.

* * * * *